United States Patent [19]

Neyret

[11] 4,352,278
[45] Oct. 5, 1982

[54] ANTI-THEFT DEVICES ON MOTOR VEHICLES

[75] Inventor: Guy Neyret, Oullins, France

[73] Assignee: Sodex-Magister, Societe d'Exploitation des Brevets Neiman, Croissy, France

[21] Appl. No.: 192,402

[22] Filed: Sep. 30, 1980

[30] Foreign Application Priority Data

Oct. 12, 1979 [FR] France ............................... 79 25408

[51] Int. Cl.³ ........................................... B60R 25/02
[52] U.S. Cl. ...................................... 70/252; 70/186
[58] Field of Search ................. 70/252, 186, 183, 184, 70/182

[56] References Cited

U.S. PATENT DOCUMENTS

| | | | |
|---|---|---|---|
| 758,024 | 4/1904 | Taylor | 70/406 |
| 3,261,187 | 7/1966 | Eichenauer | 70/252 |
| 3,527,071 | 9/1970 | Warnod | 70/252 |

FOREIGN PATENT DOCUMENTS

| | | | |
|---|---|---|---|
| 1287462 | 1/1969 | Fed. Rep. of Germany | 70/252 |
| 1817733 | 12/1970 | Fed. Rep. of Germany | 70/252 |
| 1817784 | 4/1971 | Fed. Rep. of Germany | 70/252 |

*Primary Examiner*—Robert L. Wolfe
*Attorney, Agent, or Firm*—James C. Wray

[57] ABSTRACT

The invention relates to an anti-theft device for a motor vehicle, of the type comprising a bolt restored by a spring to the position for locking an element essential to the motion of the vehicle, a lock comprising a stator and a rotor which is actuated by a coded key and which in the course of its rotation causes the bolt to be drawn back into the unlocked position, in order to prevent the bolt from returning to the locked position as long as the key has not been at least partly extracted from the rotor.

According to the invention the safety device consists of a sliding and pivoting lever accommodated in the key channel and interacting with a through-slot provided in the key.

8 Claims, 12 Drawing Figures

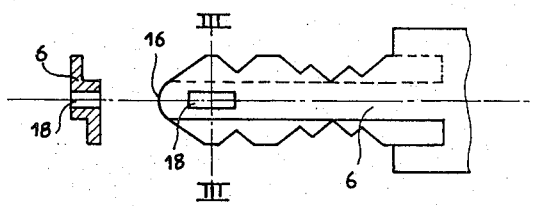
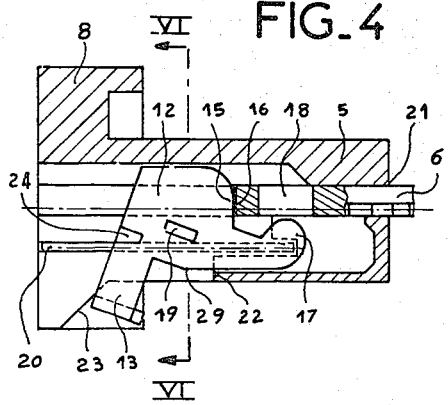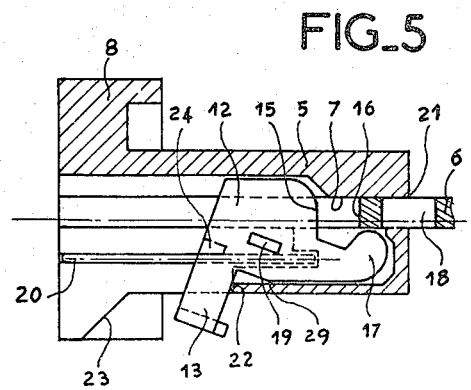
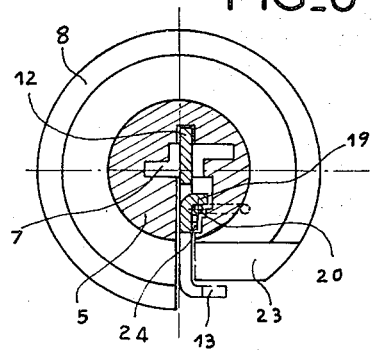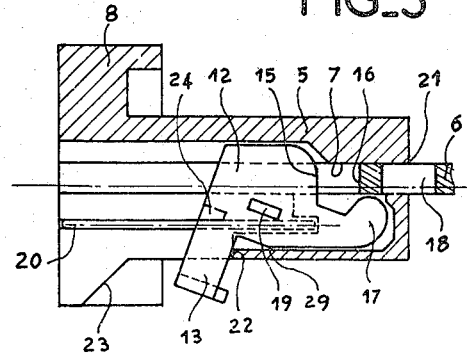
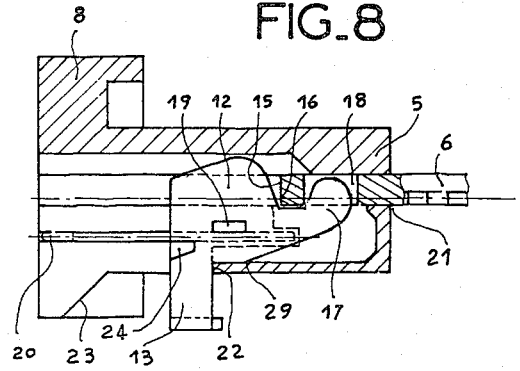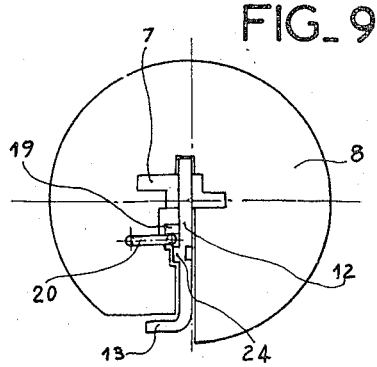

FIG_10
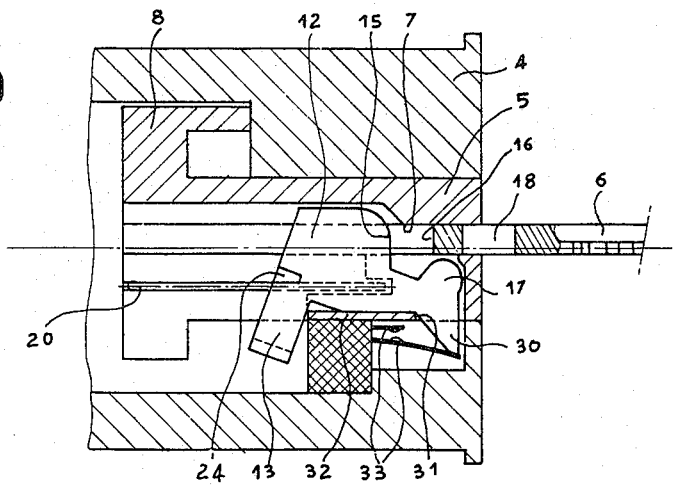
FIG_11
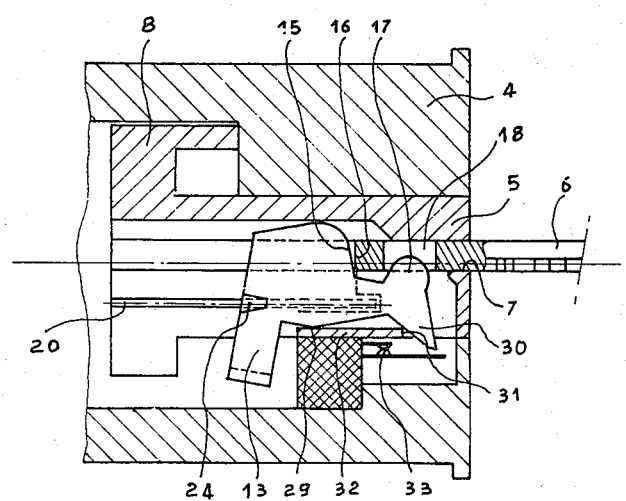
FIG_12
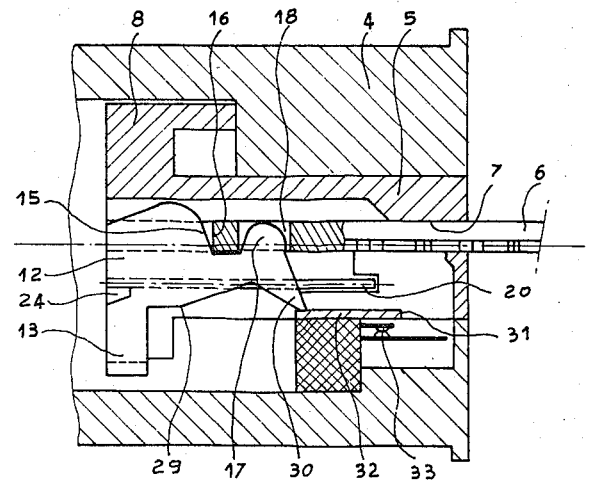

ANTI-THEFT DEVICES ON MOTOR VEHICLES

BACKGROUND TO THE INVENTION

The invention relates to an anti-theft device for a motor vehicle, of the type comprising a bolt restored by a spring to the position for locking an element essential to the motion of the vehicle, a lock comprising a stator and a rotor which is actuated by a coded key and which in the course of its rotation causes the bolt to be drawn back into the unlocked position, in opposition to the action of the said spring, and a safety device interacting with the key in order to prevent the bolt from returning to the locked position as long as the key has not been at least partly extracted from the rotor.

STATEMENT OF PRIOR ART

Various anti-theft devices of the aforementioned type are known in which the bolt interacts with the steering column in order to block the latter. These known anti-theft devices comprise means for preventing the bolt from returning to the locking position before the key has been withdrawn, in order to prevent accidental blocking of the steering while the vehicle is in motion.

In the anti-theft device described in Fr. Pat. No. 1,340,826 the safety device consists of a piece in contact with the disc of the key and directly locking the bolt. This piece is moved away from the bolt by positive action, in order to release the latter, thanks to its interaction with a notch provided in the disc of the key. The action of the safety device is thus positive but takes place at the beginning of the extraction of the key, as soon as the safety device leaves the notch. Furthermore, the operation of mounting the safety device in the lock is a fairly delicate one.

In the anti-theft device described in Fr. Pat. No. 69.26443 (Publin. No.: 2,015,837) the safety device consists of an oscillating and pivoting lever of which one end can penetrate the key channel in the absence of the key, under the action of a restoring spring, so that its other extremity will release the bolt. In this anti-theft device the bolt is released after a longer "key extraction travel" but the movement of the safety device is not positive, as it is set up by the action of the spring in the absence of the key. Furthermore, the operation of mounting this element is likewise a complicated one.

OBJECT OF THE INVENTION

The purpose of the present invention is to provide an anti-theft device of the aforementioned type in which the release of the bolt will only take place after the key has emerged almost in its entirety, at the same time ensuring the positive actuation of the safety device. The invention is also intended to provide an anti-theft device involving a far simpler production process and, in particular, capable of being easily automated.

SUMMARY OF THE INVENTION

For this purpose, the anti-theft device according to the invention is characterized by the fact that the said safety device consists of a lever accommodated in the rotor and partly projecting into the key channel of the rotor, the said lever pivoting about an axis perpendicular to the said rotor axis, elastic means for keeping the lever in its two positions, the said lever comprising a boss interacting with the point of the key, a supplementary part interacting with a ramp in order to tilt the lever from the first to the second position under the thrust of the point of the key on the said boss, the said lever also comprising a tooth, accommodated in the key channel in the second position and releasing the said key channel in the first position, the key comprising a through-slot in which the tooth of the said lever is accommodated in its second position.

BRIEF DESCRIPTION OF DRAWINGS

The invention will be clearly understood from a perusal of the following description by reference to the accompanying drawing, in which:

FIG. 2 is a plan view of a portion of a key which can be used with the anti-theft device shown in FIG. 1.

FIG. 3 is a section along the line III—III of FIG. 1.

FIG. 4 is a longitudinal section through the rotor of the anti-theft device of FIG. 1, with the key partly introduced.

FIG. 5 is analogous to FIG. 4 with the key completely extracted.

FIG. 6 is a section along the line VI—VI of FIG. 4.

FIG. 7 is analogous to FIGS. 4 and 5 with the key completely inserted.

FIG. 8 is similar to FIGS. 4, 5 and 7, showing a first position in which the key is partly extracted.

FIG. 9 is an end view of the rotor in the position shown in FIG. 8.

FIG. 10 is a longitudinal section through part of an anti-theft device according to a variant of the invention, showing the initial stage of the introduction of the key.

FIG. 11 is analogous to FIG. 10 but shows the intermediate stage of the introduction of the key.

FIG. 12 is analogous to FIGS. 10 and 11 but shows the final stage of the introduction of the key.

DESCRIPTION OF PREFERRED EMBODIMENT

Figure 1:
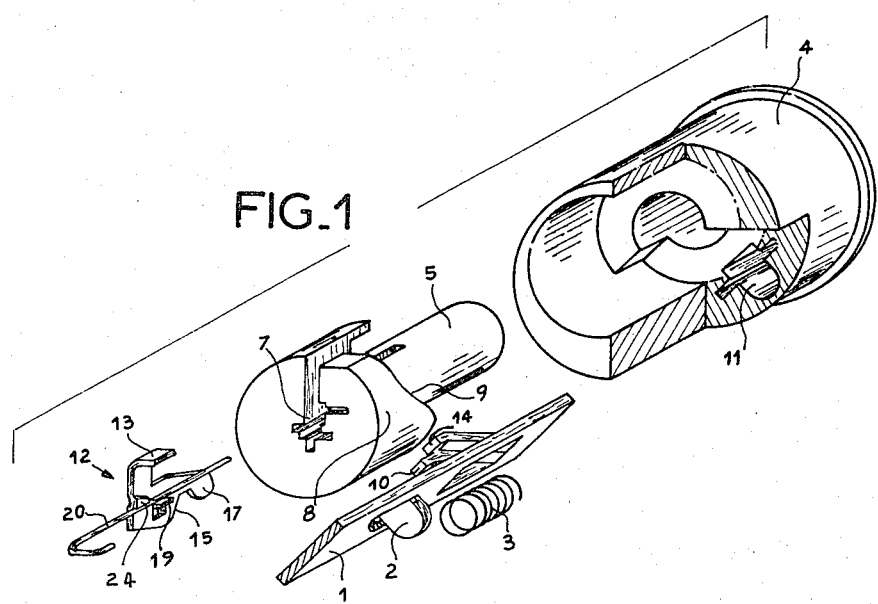
FIG. 1 is a schematic exploded view, in perspective, and partly in section, of an anti-theft device according to one embodiment of the invention.

The anti-theft device shown in FIGS. 1–9 comprises a locking bolt of which only the tang 1 has been shown in FIG. 1. The tang 1 comprises a bent tongue 2 on which acts a restoring spring 3 partly resting on a fixed portion of the anti-theft device. The said anti-theft device also comprises a lock consisting of a stator 4 in which is journalled a rotor 5 controlled by a coded key 6 (FIG. 2) accommodated in a key channel 7. The rotor 5 is provided, at its end opposite to the entry of the key 7, with a collar 8 having a cam surface 9 interacting with a lug 10 formed in the tang 1 of the bolt in order to cause the bolt to perform a traversing movement in opposition to the action of the spring 3. The tang 1 and the spring 3 are accommodated in an axial housing 11 formed in the stator 4.

The key channel 7 contains a safety device 12 which keeps the bolt in the unlocking position as long as the key 6 has not been extracted. The element 12 consists of a lever capable of pivoting about an axis orthogonal to the axis of the rotor 5 in order to release the bolt. In the example described the lever 12 includes a supplementary portion 13 which, in the course of the rotation of the lever, releases a locking device (not shown in the drawing) acting on a lug 14 of the bolt tang 1. The action of the element 12 on the bolt could be made direct, e.g. by mounting the oscillating tang at the end of the bolt, the tilting action of the lever 12 directly causing the bolt tang to move away in the axial direction and releasing the bolt.

The lever 12 comprises a boss 15 which interacts with the points 16 of the key 6 in order to set up the axial traversing and the pivoting motion of the lever, as will be explained farther on. Furthermore, the lever 12 comprises a tooth 17 which interacts with a through-slot 18 provided in the key 6.

The lever 12, which may, for example, be cut out of a metal strip, comprises a projecting lug 19 which interacts with a wire 20 accommodated in a recess of the rotor 5, in order to cause the lever to slide; in one lever position the lug 19 constitutes the pivoting axis of the lever 12. The lever 12 also comprises a projecting stud 24 which may move on either side of the wire 20, which is of the elastic piano-string type, in order to cause the lever 12 to assume two different positions which are rotatorily stable.

In the position of rest shown in FIG. 5, the key 6 having emerged from the anti-theft device, the lever 12 occupies its first stable position, in which the tooth 17 does not obstruct the key channel 7. It is also in the nearest traversing position to the entrance 21 of the key channel 7, the front surface of the supplementary portion 13 resting on a stop 22 provided in the stator 4 of the lock. If, in this position shown in FIG. 5, the key 6 is introduced into the key channel 7, the points 16 of the key 6 comes to rest against the boss 15 and pushes the lever 12 away in the axial position, the lug 19 sliding over the wire 20.

Before the key 6 has been completely inserted into the key channel 7 the rear surface of the supplementary portion 13 comes to rest against a ramp 23 provided in the collar 8 (FIG. 4). The thrust of the point of the key on the boss 15 causes the lever 12 to tilt into its second position (FIG. 7) around the lug 19 provided for this purpose, the tooth 17 penetrating the through-slot 18. During the tilting of the lever 12 into its second position the stud 24 is automatically forced to move to the other side of the elastic wire 20, thus securing the lever 12 in this second position.

In this position shown in FIG. 7 the complete introduction of the key 6 into the rotor 5 releases the latter in relation to the stator 4 of the lock. The rotation of the key 6, which actuates the rotor 5 and the collar 8 integral with the latter, results in the conventional manner in an action of the cam 9 on the lug 10 of the bolt tang 1, as a result of which the bolt (not shown in the drawing) is returned from the locking position to the unlocking position, in opposition to the action of the spring 3.

During this traversing movement of the bolt the projecting supplementary portion 13 engages the bolt retaining device (not shown) acting on the lug 10, and when the key is returned to the position shown in FIG. 7 the bolt remains in the unlocking position, under the action of the said retaining device.

If, in this position, the key 6 is pulled in order to extract from the rotor 5, the tooth 17 of the lever 12 remains in the through-slot 18, the lever 12 being caused to perform a traversing movement, remaining in its second pivoting movement, until the front surface of the supplementary portion 13 encounters the stop 22 (FIG. 8). When the extraction of the key 6 is completed the lever 12 tilts on an edge 29 provided for this purpose, in order to return to its first position (FIG. 5). In the course of this tilting movement in the reverse direction the supplementary portion 13 disengages the retaining device, which releases the bolt.

The embodiment shown in FIGS. 10–12 is similar to the foregoing, the same reference numbers having been retained for the same components. The essential difference resides in the fact that the lever 12 is provided with a front nose 30 opposite to the tooth 17 and that the lug 19 may possibly be dispensed with. The front surface of the nose 30 interacts with the edge 31 of the rotor 5. In the position of rest shown in FIG. 10 the rear part of the nose 30 rests against the edge 31.

When the key 6 is inserted its points 16 encounters the boss 15 of the lever 12, the rear surface of the nose 30 sliding against the edge 31, causing the lever 12 to pivot about its edge (FIG. 11), and the tooth 17 at the same time penetrates the through-slot 18 provided in the key 6. At the end of the insertion of the key (FIG. 12) the point of the nose 30 has slid along the surface 32 of the rotor and still rests against the said surface, so that this second pivoting position remains stable without any need to cause the wire 20 to interact with the stud 24 as in the preceding case. A simple supporting spring which keeps the lever 12 in its first tilting position might be sufficient. In this second version the tilting of the lever 12 into its second position takes place before its traversing movement, contrary to the first embodiment of the invention, the nose 30 interacting with the edge 31, performing the function of the supplementary portion 13 interacting with the edge 23.

The nose 30 can be utilized for the purpose of actuating an electrical contactor 33, which remains closed as long as the key 6 is inside the key channel 7 (FIGS. 11 and 12) and opens when the key 6 has emerged therefrom (FIG. 10) in order to interrupt the supply of current to a signalling system (not shown in the drawing) serving to indicate the presence of the key.

It will not noted that the tilting movement of the lever 12 and its retention in each of these two positions are effected in a positive manner by the stops and guides with which the said lever 12 interacts, so that the bolt safety system operates reliably, as the said bolt retention device cannot be actuated except when the key occupies the position shown.

It will also be noted that all the components of the anti-theft apparatus can be introduced into the stator 4, which likewise serves as a box, parallel to the axis of the lock, and by the rear surface of this box, so that the assembly process can be alternated.

In the anti-theft apparatus to which the invention relates the key channel is permanently occupied by the key 12, in addition to which the introduction of a force key or tool into the said channel will cause the lever 12 to tilt and the tooth 17 to penetrate the said channel. It is thus impossible to gain access to the bolt by the key channel in an unauthorized attempt to push the bolt back into the unlocking position.

In the second tilting position part of the lever 12 remains at all times opposite one or more pistons, which thus cannot be accessible to a lock breaking tool.

In the first tilting position the lever 12 is situated opposite practically all the pistons, rendering these likewise inaccessible. The lever 12 thus functions as a sealing device for the key channel.

I claim:

1. In an anti-theft device for a motor vehicle, of the type comprising a bolt restored by a spring to the position for locking an element essential to the motion of the vehicle, a lock comprising a stator and a rotor which is actuated by a coded key and which in the course of its rotation causes the bolt to be drawn back into the unlocked position, in opposition to the action of the said spring, and a safety device interacting with the key in order to prevent the bolt from returning to the locked position as long as the key has not been at least partly extracted from the rotor, the provision of a lever serving as said safety device accommodated in the rotor and partly projecting into the key channel of the rotor, the said lever pivoting about an axis perpendicular to the said rotor axis, elastic means for keeping the lever in its two positions, the said lever comprising a boss interacting with the point of the key, a supplementary part interacting with a ramp in order to tilt the lever from the first to the second position under the thrust of the point of the key on the said boss, the said lever also comprising a tooth, accommodated in the key channel in the second position and releasing the said key channel in the first position, the key comprising a through-slot in which the tooth of the said lever is accommodated in its second position.

2. Anti-theft device in accordance with claim 1, wherein the said supplementary portion is formed in the rear part of the lever and the ramp is situated behind the lever.

3. Anti-theft in accordance with claim 1, wherein the said lever comprises a lug causing it to slide on the said wire.

4. Anti-theft in accordance with claim 1, wherein the said supplementary portion formed in the front part of the lever and the rear surface of the said supplementary portion, forming a ramp, interacts with the said edge.

5. Anti-theft device in accordance with claim 2, wherein the elastic means for retaining the lever in its two angular positions comprise an elastic metal wire with which a projecting lug formed in the said lever interacts, the said lug being capable of moving to either side of the said wire.

6. Anti-theft device in accordance with claim 4, wherein the elastic means for retaining the lever in its two angular positions comprise a spring which thrusts the lever towards one of these positions, the action of retaining it in the other position being effected by the interaction of the supplementary portion with a guide surface, in opposition to the action of the said spring.

7. Anti-theft device in accordance with claim 1, wherein the lever interacts with an electrical contactor indicating the presence of a key.

8. Anti-theft device in accordance with claim 1, wherein the said lever is situated opposite at least one piston.

* * * * *